Nov. 30, 1965 W. H. KRAUSE 3,220,243
KNOCK MEASUREMENT BY IONIZED GAP
Filed April 23, 1962 2 Sheets-Sheet 1

INVENTOR.
WARREN H. KRAUSE
BY
Schramm, Kramer & Sturges
ATTORNEYS.

United States Patent Office 3,220,243
Patented Nov. 30, 1965

3,220,243
KNOCK MEASUREMENT BY IONIZED GAP
Warren H. Krause, Cleveland, Ohio, assignor to The Standard Oil Company, Cleveland, Ohio, a corporation of Ohio
Filed Apr. 23, 1962, Ser. No. 189,436
1 Claim. (Cl. 73—35)

This invention relates to indication of detonation and pressure impulses and particularly to the measurement of the antiknock qualities of gasoline and other fuels for internal combustion engines.

Fuels for internal combustion engines vary in their tendency to produce knock or detonation. Some quick burning fuels produce an audible noise or ping, which is not only disturbing but also indicative of a pressure condition in the engine cylinder which is injurious to the engine. Some pressure indicators have been proposed for estimating difference in antiknock qualities of engine fuels by attempting to determine the value of the peak pressure.

The knocking process in an Otto cycle spark ignition engine is accompanied by a cycling ionization and deionization of the gaseous medium within the cylinder at a frequency varying between 6 and 8 kilocycles per second, in addition to lower frequencies. Although the amplitude of this cycling function, for individual fuels, varies to a minor extent from one engine cycle to another, it has been found to be of different average intensities for different fuels. This property may be used for measuring knock characteristics of fuels.

The present invention relates to an indicator which responds to variations in ionization in internal combustion engine cylinders fed with fuels having different antiknock qualities.

In carrying out the invention in accordance with a preferred form thereof, an ionizable gap is mounted within the cylinder of an internal combustion engine and an electro-responsive detector is connected in series with the ionizable gap and a source of direct voltage with a 6 to 8 kilocycle band pass filter interposed between the ionized gap and the detector. The response of the detector, depending upon the degree of ionization within the gap, is utilized as a measure of the antiknock quality of the fuel.

A better understanding of the invention will be afforded by the following detailed description, considered in conjunction with the accompanying drawings, in which.

Like reference characters are utilized throughout the drawing to designate like parts.

Figure 5:
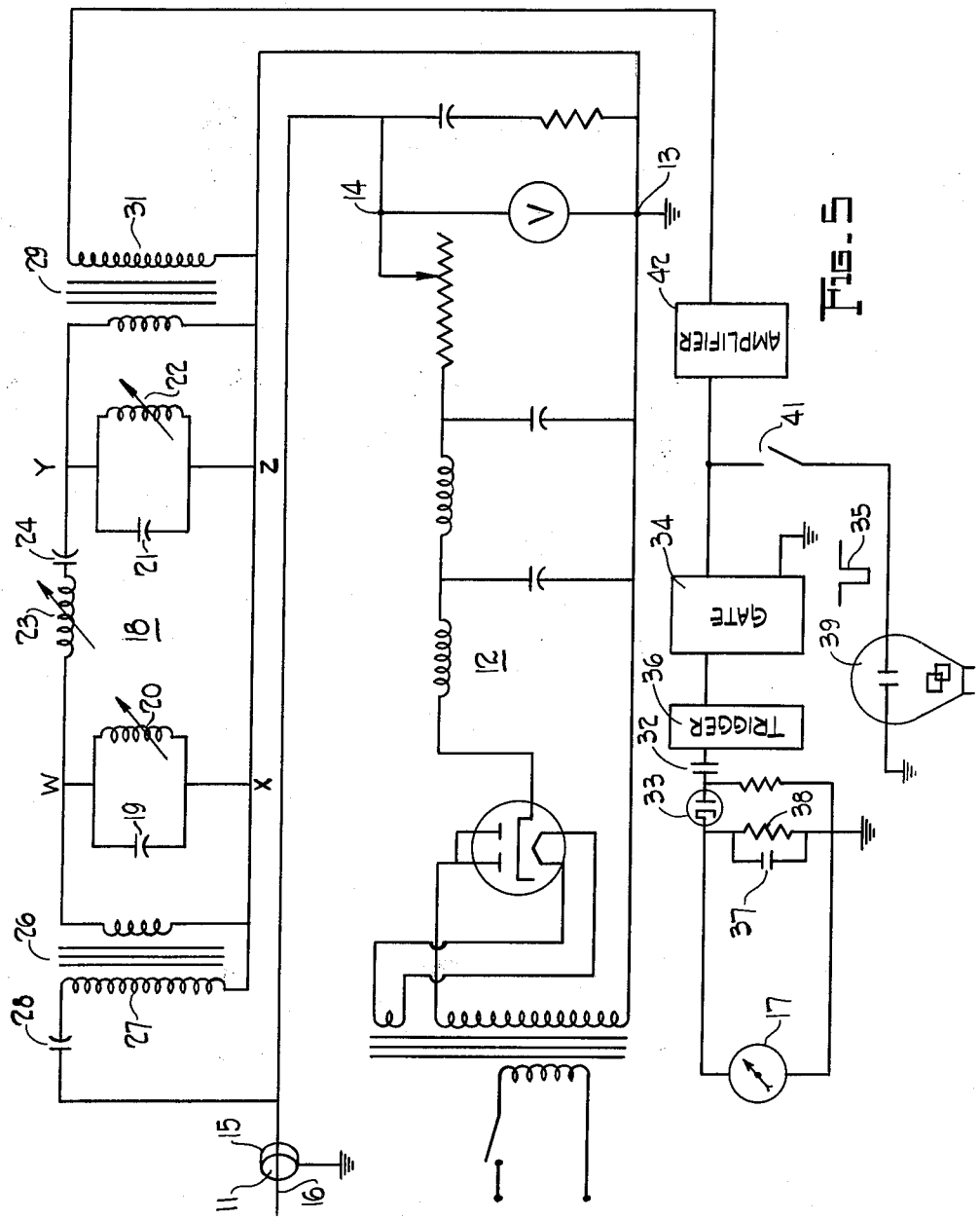
FIG. 5 is a circuit diagram of an embodiment of the invention.

In the circuit diagram of FIG. 5, there is an ionizable gap 11 mounted within the cylinder of an internal combustion engine.

For supplying an undirectional or direct voltage to the gap 11, a conventional power supply 12 is provided, having a grounded terminal 13 and a positive terminal 14. The outer electrode or ring 15 of the gap 11 is also grounded and the center electrode 16 is connected to the positive terminal 14 of the voltage supply 12. The gap 11 may be similar in form to miniature spark-plugs used as ignition plugs for model airplane engines, such as the Champion model VR-1, with added shielding to prevent electrical interference.

A voltage detector 17 is coupled to a connection across the gap 11.

A high frequency band pass filter 18, with pass band centered on 7,000 cycles per second, is interposed in the connection coupling the gap 11 to the detector or instrument 17. As shown, the filter 18 comprises a pi network having a condenser 19 and an adjustable inductance 20 connected in parallel between filter input terminals W and X and having a condenser 21 and an adjustable inductance 22 connected in parallel between filter output terminals Y and Z. An adjustable inductance 23 and capacitor 24 are serially connected between the filter terminals W and Y. The signal of the ion gap is filtered through a band pass filter to remove all the low frequencies such as the frequency corresponding to the pulse width of the normal, non-knocking signal.

The filter input terminals W and X are coupled to the gap 11 through a step down transformer 26 having a primary winding 27 connected at one end to the grounded filter terminals X and Z and the ground terminal 13 and coupled on the upper end through a coupling condenser 28 to the center electrode 16 of the gap 11.

The output terminals Y and Z of the filter 18 in turn are coupled to the detector 17 through a step-up transformer 29 having a secondary winding 31 coupled to the instrument 17 through a capacitor 32.

A rectifier 33 is interposed in order that the detector 17 may take the form of a D.-C. instrument and measure the magnitude of pulse trains passing through the filter 18. Preferably, a gate 34 which may be of conventional electronic form responsive to the amplified high frequency output of the band-pass filter 18 is interposed in order that ignition noise at the commencement of the filtered trace may be eliminated from the measurement made in the instrument 17. It will be understood that the spark gap of an internal combustion engine acts like the gap in a spark type radio transmitter or transmitter of damped waves so that it produces damped waves representing the ignition noise which cover a very wide range of frequencies which cannot be filtered out and produces noise responses over a very wide frequency spectrum even in sharply tuned detectors. It has been found that this spectrum extends throughout the region from 6 to 10 kilocycles. The gate 34 is a conventional electronic circuit for producing a negative square wave form of the shape 35 to eliminate the initial, ignition noise produced, portion of the trace, thus being a time gate, and is rendered responsive only to the receipt of pulses from the output terminal Y through the transformer 29 of the high frequency band pass filter 18. A mechanical gating device such as a grounding distributor, synchronized with the flywheel, may also be used.

A trigger 36, which may also be a conventional electronic circuit, is interposed between the gate 34 and the rectifier 33 and arranged to be responsive to the positive excursion of the gate 34 for passing the remainder of the ion gap signal to the instrument 17 through the rectifier 33 and the coupling condenser 32.

It will be understood that the negative square wave 35 acts in a conventional manner upon a suitable grid in a vacuum tube stage (not shown separately from the block 34) following the amplifier 42 to cut off the signal until the positive excursion of the wage 35 actuates the trigger 36 to restore potential and allow the signal to pass.

A low pass filter consisting of parallel capacitor 37 and resistor 38 may be interposed between the rectifier 33 and the coupling condenser 32.

In order that the instantaneous form of the ion gap trace may be observed, a cathode ray oscilloscope 39 may be provided having conventional circuits and including a sweep circuit represented by deflection plates adapted to be connected through a switch 41 to the output of an amplifier 42 connected to the winding 31 of the output transformer 29 of the high frequency band pass filter 18.

During the ordinary combustion process occurring in an Otto cycle engine, ions are formed, and exist momentarily as transient intermediates. These ions are unstable and decay upon the completion of combustion. The gap 11 inserted in the cylinder with its electrodes exposed to the flame has a small direct voltage applied across the electrodes by the power supply 12 insufficient to cause an arc or spark under normal conditions. During combustion, during the period of time when ions are present within the volume between the electrodes, these ions will assist the passage of a feeble electric current across the gap. This is observed as an oscillation in voltage at the positive ion gap electrode 16. The potential difference falls rapidly as the flame reaches the gap, then as the combustion diminishes, the potential gradually rises to its former level.

Figure 1:
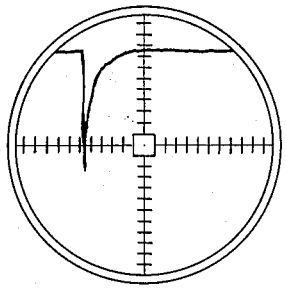
FIGS. 1, 2 and 3 are graphs of the ion gap signal for non-knocking, light-knock and severe-knock fuels, respectively.
Figure 2:
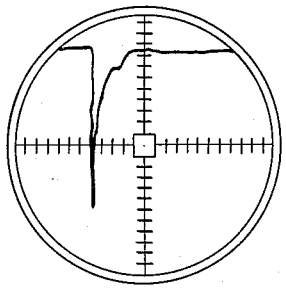

A voltage-time diagram, as observed on the ordinary cathode-ray oscilloscope, is shown in FIG. 1. With a bias voltage of the center electrode 16 of the ion gap of the order of plus 120 volts, under typical non-knocking engine operating conditions, the drop in voltage observed during the combustion is of the order of 20 volts peak. In the standard knock test engine firing 450 times per minute, it has been observed that the normal pulse width is of the order of 0.01 second. A great deal of difference in this voltage-time function is brought about by the presence or absence of varying degrees of knock. FIG. 2 is a diagram of a typical voltage-time ion gap trace under light knocking conditions and FIG. 3 under more severe knocking conditions.

As shown by these diagrams, there are three distinct effects:

(1) The peak voltage drop increases with the severity of knocking, indicating that there is a greater degree of bulk ionization of the medium within the cylinder with increasing knock;

(2) The return slope of the signal, after peak voltage is reached, is more erratic under knocking conditions, and usually requires longer to return to normal bias than under non-knocking conditions. Thus, an extra release or a prolongation of the concentration of ions or heat or both is shown under knocking conditions;

(3) Under knocking conditions the return slope of the signal, after the peak drop in voltage is reached, also contains a high frequency component, superimposed upon the low frequency (0.01 second width) pulse, and ranging in frequency between 6 and 8 kilocycles per second.

The filtered ion gap signal passing through the high frequency band pass filter 18 and amplified in the amplifier 42 reveals by comparison of the signals that the high frequency component exists only after peak ionization has been reached. This is illustrated in FIG. 4.

Figure 3:
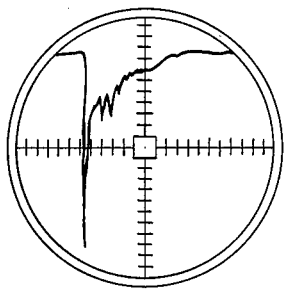
Figure 4:
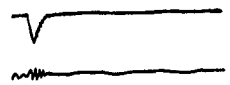
FIG. 4 is a reproduction of oscillograph traces for unfiltered and filtered ion gap signals, respectively, of a knocking fuel.

The upper curve of FIG. 4, corresponding to FIGS. 1, 2 and 3, represents the signal before filtering and amplification, and the lower curve represents the signal after filtering and amplification. Since the high amplitude peak of FIGS. 1, 2 and 3 and the upper curve of FIG. 4 is a low frequency effect, it disappears after filtering. With amplification the "teeth" in the portion of the trace returning to horizontal appear as the high frequency oscillations centered on the axis as they appear in the lower curve of FIG. 4.

Figure 7:
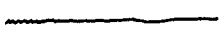
FIG. 7 is a reproduction of ion gap traces unfiltered and filtered for a fuel with only inaudible knock.
Figure 8:
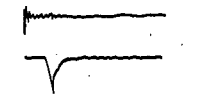
FIG. 8 is a reproduction of oscilloscope ion gap traces for a fuel with light knock.
Figure 9:
FIG. 9 is a reproduction of corresponding ion gap traces for a fuel with a severe knock.

Since the ignition noise of the damped waves produced by the current discharge through the spark gap includes components throughout the spectrum above and below and includes the band from 6 to 8 kilocycles, they are not eliminated by the band pass filter 18 and appear as shown in the lower curve of FIG. 4 at the portion of the time base representing the interval immediately after the spark has been made and before the flame has traversed the combustion chamber to the ionizable gap to produce the approximately 7 kilocycle oscillations representative of knock. The time interval between the ignition noise and the knock signals is best seen in FIG. 9. The ignition noise and knock signals are roughly of the same frequency, since they have both passed through the band pass filter 18. FIGS. 7, 8 and 9 correspond, of course, to the other graphs except that the filtered and amplified signal traces have been shown above instead of below the unfiltered trace.

Figure 6:
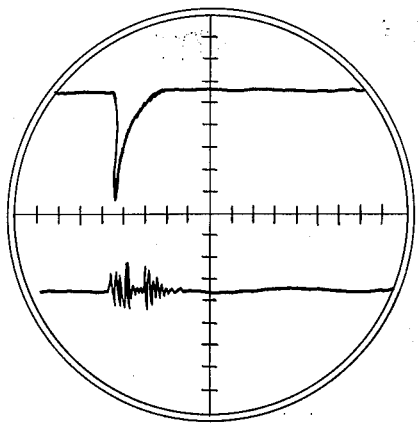
FIG. 6 is a graph illustrating an ion gap trace for a knocking fuel and a filtered amplified ion gap trace for the same fuel.

As shown by FIG. 9, the oscillations representing knock for a moderately severe knock which are shown immediately above a peak in the unfiltered wave are no greater than the oscillations appearing at the beginning of FIG. 9 representative of ignition noise. This is also shown in FIG. 6. As shown in FIG. 8 for a fuel having a trace knock, the ignition noise oscillations are greater than those produced by knock. Accordingly, in order to utilize a detection instrument which will be sensitive and be responsive to knock and not to ignition noise, it is necessary to employ a time gate as described for cutting out the ignition noise signals.

Thus, it is observed that:

(1) Peak cylinder gas ionization and knocking are directly related.

(2) Knocking occurs after the maximum ionization has been reached.

(3) Knocking is accompanied by a continued cycling ionization and re-ionization of the medium within the cylinder.

The high frequency component of the ionized gap signal serves to operate a high frequency knock detection instrument. This arrangement may be used as an alternative to the pressure sensitive pickup and detector described in my co-pending application Serial No. 179,877, filed March 15, 1962. In the use of an ionized gap, however, the band pass filter is inserted between the ionized gap and the input potentiometer rather than between stages of the amplifier.

The forms of voltage-time function observed at the ion gap, and at the output terminal Y of the band pass filter, under conditions of trace knock, are as shown in the upper and lower traces, respectively, of FIG. 6. The diagrams of FIGS. 7, 8 and 9 show the relationship between octane number (i.e., knock intensity) and the relative amplitudes of high frequency obtainable after filtering through the band pass filter and amplifying through one stage of the amplifier.

The diagrams of FIGS. 7, 8 and 9 were made by photographing the oscilloscope screen on tests using a single cylinder CRF-48 engine operating at the following conditions:

| | |
|---|---|
| Compression ratio | 7.5 |
| Basic spark advance, degrees | 15 |
| R.p.m. | 900 |
| Inlet air temperature, ° F. | 110 |
| Jacket temperature, ° F. | 148 |

FIG. 7 represents an inaudible knock resulting from the use of 100 octane commercial reference fuel.

FIG. 8 represents a trace knock resulting from the use of 90 octane commercial reference fuel.

FIG. 9 represents a moderately severe knock resulting from the use of 80 octane commercial reference fuel.

Cyclic variation in the amplitude of the high frequency knocking signal is also observed, as in the case of the pressure sensitive pickup described in the aforesaid co-pending application; thus, the ion gap may be used as an alternate detector in the apparatus of that application.

In accordance with the provisions of the patent statutes, the principle of operation of the invention has been described together with the apparatus now believed to represent the best embodiment thereof, but it is to be understood that the apparatus shown and described is only illustrative and that the invention may be carried out by other arrangements.

What is claimed is:

An internal combustion engine knock-responsive instrument comprising in combination with terminals for connection to a voltage source, an ionizable gap adapted to be mounted within the cylinder of an internal combustion engine and electrically connected in series with said terminals, a band pass filter with a pass band centered on approximately 7 kilocycles, a current-responsive detector responsive to impulses within the range of the band pass filter, said band pass filter being interposed between the ionizable gap and the detector having a step-down transformer interposed between the ionizable gap and the band pass filter and a step-up transformer interposed between the band pass filter and the detector, an amplifier interposed between the step-up transformer and the detector, a negative square wave time gate between the amplifier and the detector for response to the amplified output of the filter and suppressing ignition noise during the beginning of a train of ionization pulses, and a trigger interposed between the gate and the detector responsive to voltage rise in the gate for admitting the output of the gate to the detector.

References Cited by the Examiner

UNITED STATES PATENTS

| | | | |
|---|---|---|---|
| 2,291,045 | 7/1942 | Lancor | 73—35 |
| 2,337,522 | 12/1943 | Eldredge | 73—35 |
| 2,448,323 | 8/1948 | De Boisblanc | 73—35 |
| 2,517,976 | 8/1950 | Clarke | 73—35 X |
| 2,523,017 | 9/1950 | Harrison | 73—35 X |
| 2,543,141 | 2/1951 | Vinchnievsky | 73—35 |
| 2,633,738 | 4/1953 | De Boisblanc | 73—35 |
| 2,879,665 | 3/1959 | Adams | 73—35 |
| 2,964,939 | 12/1960 | Forrest | 73—35 |

RICHARD C. QUEISSER, *Primary Examiner.*